(12) United States Patent
Hirashima et al.

(10) Patent No.: US 9,319,397 B2
(45) Date of Patent: Apr. 19, 2016

(54) ON-VEHICLE GATEWAY APPARATUS AND COMMUNICATION SYSTEM FOR VEHICLE

(75) Inventors: Osamu Hirashima, Toyota (JP); Yuusuke Satoh, Toyota (JP); Katsunori Kawai, Toyota (JP); Masahiro Makino, Komaki (JP); Koutarou Hara, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 83 days.

(21) Appl. No.: 14/343,867

(22) PCT Filed: Sep. 12, 2011

(86) PCT No.: PCT/JP2011/070767
§ 371 (c)(1),
(2), (4) Date: Mar. 10, 2014

(87) PCT Pub. No.: WO2013/038479
PCT Pub. Date: Mar. 21, 2013

(65) Prior Publication Data
US 2014/0226673 A1    Aug. 14, 2014

(51) Int. Cl.
*H04L 12/28* (2006.01)
*H04L 29/06* (2006.01)
*H04L 12/40* (2006.01)
*H04L 12/46* (2006.01)
*H04W 12/06* (2009.01)
*H04L 12/947* (2013.01)

(52) U.S. Cl.
CPC .......... *H04L 63/08* (2013.01); *H04L 12/40006* (2013.01); *H04L 12/4625* (2013.01); *H04L 29/06* (2013.01); *H04L 49/25* (2013.01); *H04W 12/06* (2013.01); *H04L 2012/40273* (2013.01)

(58) Field of Classification Search
CPC ....... H04L 29/06; H04L 12/947; H04L 63/08; H04L 12/40006
USPC ......................................................... 370/401
See application file for complete search history.

(56) References Cited

U.S. PATENT DOCUMENTS

| | | | |
|---|---|---|---|
| 7,643,944 B2 | 1/2010 | Spratte et al. | |
| 2003/0009271 A1 | 1/2003 | Akiyama | |
| 2003/0045235 A1* | 3/2003 | Mooney et al. | 455/41 |
| 2011/0013522 A1 | 1/2011 | Kishigami | |
| 2014/0204832 A1* | 7/2014 | Van Phan et al. | 370/315 |

FOREIGN PATENT DOCUMENTS

| | | |
|---|---|---|
| JP | 2003-46536 | 2/2003 |
| JP | 2010-232867 | 10/2010 |
| JP | 2011-24100 | 2/2011 |
| WO | WO 2009/147734 A1 | 12/2009 |

\* cited by examiner

*Primary Examiner* — Sai-Ming Chan
(74) *Attorney, Agent, or Firm* — Finnegan, Henderson, Farabow, Garrett & Dunner, LLP (57) ABSTRACT

An on-vehicle gateway apparatus that carries out authentication of an external apparatus at a time of connection between the external apparatus and a vehicle, and relays communications between the external apparatus and in-vehicle communication when the authentication is successful, operates due to power supply from the external apparatus at a time of connection between the external apparatus and the vehicle, and carries out authentication of the external apparatus.

18 Claims, 6 Drawing Sheets

FIG.6

ON-VEHICLE GATEWAY APPARATUS AND COMMUNICATION SYSTEM FOR VEHICLE

CROSS-REFERENCE TO RELATED APPLICATIONS

This application is a national phase application of International Application No. PCT/JP2011/070767, filed Sep. 12, 2011, the content of which is incorporated herein by reference.

TECHNICAL FIELD

The present invention relates to an on-vehicle gateway apparatus and a communication system for a vehicle. In particular, the present invention relates to an on-vehicle gateway apparatus that, at a time of connection between an external apparatus and a vehicle, carries out authentication configuration of the external apparatus, and relays communications between the external apparatus and in-vehicle communication when the external apparatus has been authenticated, and a communication system for a vehicle.

BACKGROUND ART

A relay unit for a vehicle has been known which prevents unauthorized access to an on-vehicle LAN (Local Area Network) through a diag connector or the like when an off-vehicle apparatus such as a fault diagnosis tool is connected to the vehicle (for example, see Patent Document 1). In a relay unit for a vehicle described in Patent Document 1, a gateway ECU (Electronic Control Unit) that relays data communication between an on-vehicle LAN and an off-vehicle apparatus is mounted. The gateway ECU authenticates the off-vehicle apparatus, and thus, allows only legitimate access.

Patent Document 1: Japanese Laid-Open Patent Application No. 2003-46536
Patent Document 2: Japanese Laid-Open Patent Application No. 2010-232867

SUMMARY OF THE INVENTION

Problem to be Solved by the Invention

In the configuration described in the above-described Patent Document 1, it is necessary to additionally mount a gateway ECU between the on-vehicle LAN and an external apparatus for preventing unauthorized access. However, there is a problem that, due to mounting the gateway ECU, a consumption current within the vehicle increases. Further, the power is supplied to the gateway ECU from an on-vehicle battery. The gateway ECU is always in a standby state to prepare for authentication to be carried out at a time of connection with an off-vehicle apparatus and thus a standby current is needed. Therefore, there is a problem that the consumption current is increased and there is a likelihood that the battery runs down, or fuel consumption degrades due to an increase in power generation opportunities.

Further, a relay system has been proposed (for example, see Patent Document 2) in which in order to decrease the number of communication lines between a gateway ECU and an ECU that functions as a control unit, a power supply circuit and a CAN transceiver are not provided in the gateway ECU, and only a relay processing circuit, a crystal oscillator, an EEPROM and a connector are provided in the gateway ECU. The ECU that functions as a control unit includes the power supply circuit and so forth. When a connector of the ECU that functions as a control unit is connected with a connector of the gateway ECU, the ECU that functions as a control unit then also functions as a relay unit.

However, in the relay system described in Patent Document 2, both the gateway ECU and the ECU that functions as a control unit are on-vehicle ECUs. Therefore, the power is supplied to both the gateway ECU and the ECU that functions as a control unit from the on-vehicle battery whether the gateway ECU and the ECU that functions as a control unit are separated or connected. Thus, there is a problem that, although it is possible to reduce the number of communication lines, it is not possible to reduce the consumption current.

Therefore, an objective of the present invention is to provide an on-vehicle gateway apparatus and a communication system for a vehicle by which it is possible to reduce the consumption current while improving the security of preventing unauthorized access.

Means for Solving the Problem

In order to achieve the above-mentioned objective, an on-vehicle gateway apparatus according to one mode of the present invention carries out authentication of an external apparatus at a time of connection between the external apparatus and a vehicle, and relays communications between the external apparatus and in-vehicle communication when the authentication is successful, and at a time of connection between the external apparatus and the vehicle, the on-vehicle gateway apparatus operates due to power supply from the external apparatus, and carries out authentication of the external apparatus.

An on-vehicle gateway apparatus according to another mode of the present invention carries out authentication of an external apparatus at a time of connection between the external apparatus and a vehicle, and relays communications between the external apparatus and in-vehicle communication when the external apparatus has been authenticated, and the on-vehicle gateway apparatus includes:

a power supply line from the on-vehicle battery; and
a power supply switch means that switches between carrying out and not carrying out power supply from the on-vehicle battery, and at a time of connection between the external apparatus and the vehicle, the on-vehicle gateway apparatus operates due to power supply from the on-vehicle battery as a result of switching in the power supply switch means being controlled by a control means provided in the external apparatus, and carries out authentication of the external apparatus.

Further, a communication system for a vehicle according to another mode of the present invention includes:

an external apparatus connectable with a vehicle; and
an on-vehicle gateway apparatus that carries out authentication of the external apparatus at a time of connection between the external apparatus and the vehicle, and relays communications between the external apparatus and in-vehicle communication when the authentication is successful, and the external apparatus includes a power supply means, the power supply means carries out power supply to the on-vehicle gateway apparatus at a time of connection between the external apparatus and the vehicle, and the on-vehicle gateway apparatus operates and carries out authentication of the external apparatus.

A communication system for a vehicle according to another mode of the present invention includes:

an external apparatus connectable with a vehicle; and
an on-vehicle gateway apparatus that carries out authentication of the external apparatus at a time of connection between the external apparatus and the vehicle, and relays communications between the external apparatus and in-vehicle communication when the authentication is successful, and the on-vehicle gateway apparatus has a power supply line from an on-vehicle battery, and a power supply switch means that switches between carrying out and not carrying out power supply from the on-vehicle battery, the external apparatus has a control means that controls switching in the power supply switch means, and at a time of connection between the external apparatus and the vehicle, the on-vehicle gateway apparatus operates due to power supply from the on-vehicle battery as a result of switching in the power supply switch means being controlled by the control means, and carries out authentication of the external apparatus.

Advantageous Effect of the Invention

According to the present invention, it is possible to reduce standby power, and also, improve the security by preventing unauthorized access.

DESCRIPTION OF REFERENCE NUMERALS 10-14 gateway ECUs (on-vehicle gateway apparatuses)
20 transceiver for communication for outside of vehicle
21 MCU
22 transceiver for in-vehicle communication
23-26, 55, 85 power supply lines
30 bus for in-vehicle communication
40 connector
50 on-vehicle battery
60-63 external apparatuses
70 communication means
80 battery
81-83, 83a, 84 power supply circuits
90 power supply switch control means
91, 92 power supply switch means
95 control line
100 vehicle

BEST MODES FOR CARRYING OUT THE INVENTION

Below, modes for carrying out the present invention will be described with reference to drawings.

Embodiment 1

Figure 1:
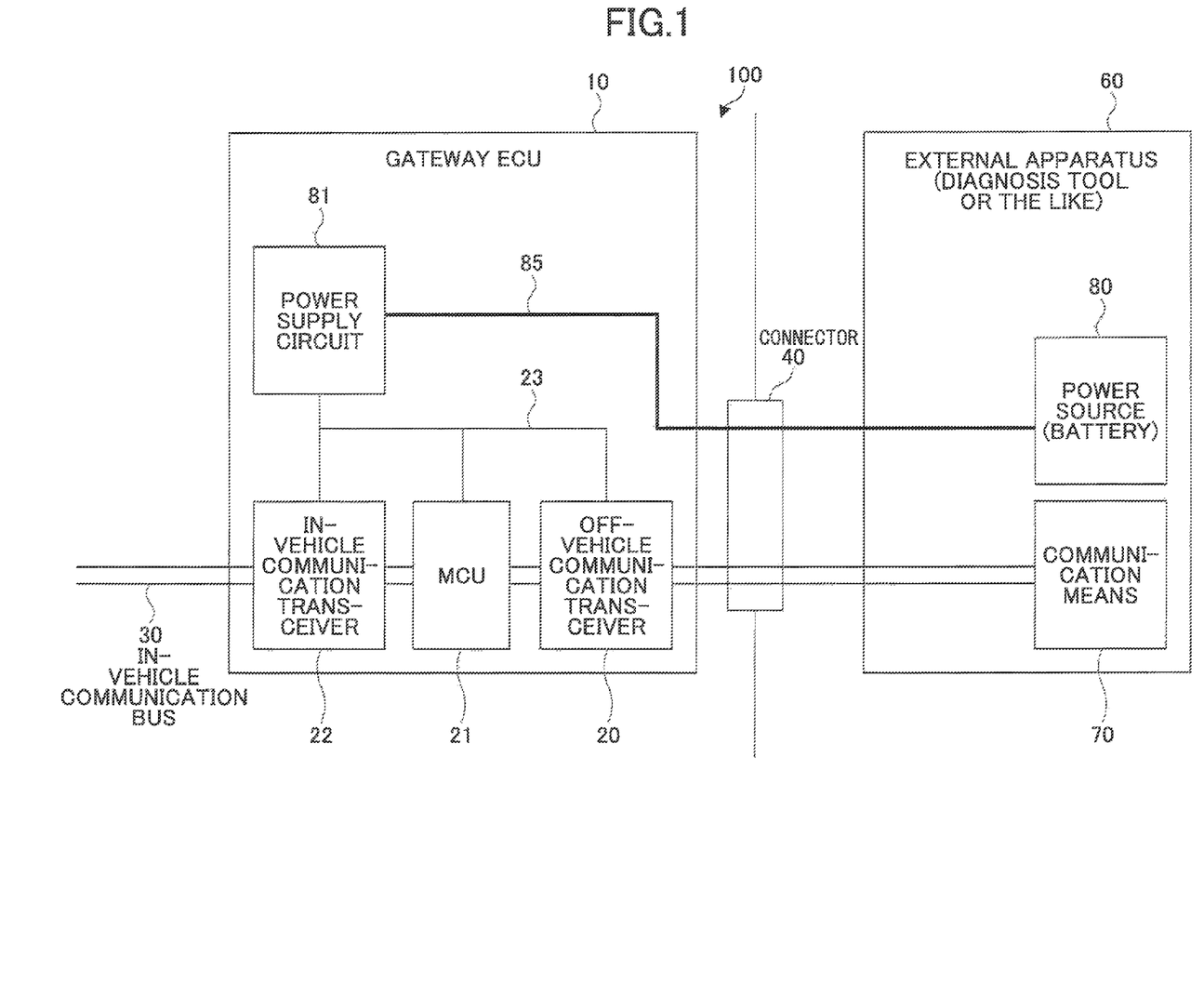
FIG. 1 is a configuration diagram showing one example of an on-vehicle gateway apparatus and a communication system for a vehicle according to Embodiment 1 of the present invention.

FIG. 1 is a configuration diagram showing one example of an on-vehicle gateway apparatus and a communication system for a vehicle according to Embodiment 1. In FIG. 1, the communication system for a vehicle according to Embodiment 1 includes a gateway ECU (Electronic Control Unit) 10, a bus 30 for in-vehicle communication, a connector 40, and an external apparatus 60. Further, as an associated element, a vehicle 100 is shown. The gateway ECU 10, the bus 30 for in-vehicle communication and the connector 40 are installed inside the vehicle 100, and the external apparatus 60 is installed outside the vehicle 100. Note that an on-vehicle gateway apparatus can be referred to as a gateway ECU for the present embodiment and subsequent embodiments.

Further, the on-vehicle gateway apparatus (gateway ECU 10) according to Embodiment 1 includes a transceiver 20 for communication for the outside, a MCU (Micro Control Unit) 21, a transceiver 22 for in-vehicle communication, and power supply lines 23. Further, the external apparatus 60 includes a communication means 70, and a battery 80.

The gateway ECU 10 and the external apparatus 60 are connected via the connector 40. Further, the gateway ECU 10 is connected with the bus 30 for communication for outside of vehicle. In particular, the transceiver 22 for in-vehicle communication, the MCU 21 and the transceiver 20 for communication for outside of vehicle, inside the gateway ECU 10, are connected with the bus 30 for in-vehicle communication. Further, the communication means 70 in the external apparatus 60 is connected with the bus 30 for in-vehicle communication via the connector 40. Further, a power supply circuit 81 in the gateway ECU 10 is connected with the transceiver 20 for communication for outside of vehicle, the MCU 21 and the transceiver 22 for in-vehicle communication through the power supply lines 23. The power supply circuit 81 in the gateway ECU 10 is connected with the battery 80 in the external apparatus 60 through a power supply line 85 via the connector 40.

The gateway ECU 10 is an electronic control unit for a vehicle that carries out authentication of the external apparatus 60 when the external apparatus 60 has been connected with the connector 40 in the vehicle 100, and relays communications between the external apparatus 60 and in-vehicle communication when authentication is successful and the gateway ECU 10 has determined that the external apparatus 60 is a legitimate external apparatus 60. Thus, the gateway ECU 10 functions as a firewall to prevent, through authentication, the external apparatus 60 from carrying out unauthorized access to the in-vehicle communication, and also, functions as a relay unit that relays communications in response to legitimate access.

In order to implement such functions, the gateway ECU 10 includes the transceiver 20 for communication for outside of vehicle, the MCU 21 and the transceiver 22 for in-vehicle communication.

The transceiver 20 for communication for outside of vehicle is a communication means for carrying out communication with the external apparatus 60 when the external apparatus 60 outside the vehicle 100 has been connected to the vehicle 100, and has a configuration such that both transmission and reception are made possible. The external apparatus 60 is connected to the vehicle 100 as a result of being connected to the connector 40 installed in the vehicle 100. Therefore, the transceiver 20 for communication for outside of vehicle is connected with the connector 40 via the bus 30 for in-vehicle communication. When the external apparatus 60 has been connected to the connector 40, the communication means 70 in the external apparatus 60 is connected with the transceiver 20 for communication for outside of vehicle via the connector 40.

The MCU 21 is a controller for carrying out various processes in the gateway ECU 21, and may include a CPU (Central Processing Unit) that operates according to a program. When the external apparatus 60 and the vehicle 100 are connected, the MCU 21 carries out an authentication process with the external apparatus 60, and carries out authentication determination as to whether the external apparatus 60 is a legitimate external apparatus 60.

Note that as for the authentication process, various authentication methods can be used depending on the intended use. For example, an authentication method can be used such that an identification request signal including an ID code is transmitted from the external apparatus 60, the transceiver 20 for communication for outside of vehicle receives it, the MCU 21 compares the received ID code with a predetermined ID code, determines the access as legitimate access when the ID codes are coincident with one another and the authentication is successful, and determines the access as unauthorized when the ID codes are not coincident with one another and the authentication is not successful.

The transceiver 22 for in-vehicle communication is a communication means for in-vehicle communication, and is connected with the bus 30 for in-vehicle communication. That is, the in-vehicle communication is carried out by using the bus 30 for in-vehicle communication. Note that also the transceiver 22 for in-vehicle communication has a configuration such that both transmission and reception are made possible.

The power supply lines 23 are connection lines for supplying the power to various processing means in the gateway ECU 10 such as the transceiver 20 for communication for outside of vehicle, the MCU 21 and the transceiver 22 for in-vehicle communication. In FIG. 1, as the processing means in the gateway ECU 10, only the transceiver 20 for communication for outside of vehicle, the MCU 21 and the transceiver 22 for in-vehicle communication are shown. However, the gateway ECU 10 may include other processing means as the need arises, and in such a case, the power supply lines 23 are connected to all the processing means for which the power supply is necessary.

The power supply circuit 81 is a circuit for controlling a power supply voltage when the power is supplied to the processing means in the gateway ECU 10 including the transceiver 20 for communication for outside of vehicle, the ECU 21 and the transceiver 22 for in-vehicle communication. Therefore, the power supply circuit 81 may have a configuration to supply voltages suitable for causing the transceiver 20 for communication for outside of vehicle, the ECU 21, the transceiver 22 for in-vehicle communication and so forth to operate. For example, the power supply circuit 81 may have a configuration to supply a voltage on the order of 5 volts. Further, the power supply circuit 81 may also have a configuration to carry out voltage control and current control necessary to supply the power to the respective processing means.

The bus 30 for in-vehicle communication is a bus to be used for an on-vehicle LAN (Local Area Network), whereby various ECUs (not shown) included in the vehicle 100 are connected together, and communication between the ECUs is made possible. For the on-vehicle LAN, various network standards may be employed depending on the intended uses, such as a CAN (Controller Area Network), a LIN (Local Interconnect Network), a MOST (Media Oriented Systems Transport bus) or a FlexRay.

The connector 40 is a means for making it possible to connect the external apparatus 60 and the vehicle 100. The connector 40 is installed at any place on a surface in the vehicle interior in a manner of being exposed so that connection pins or the like installed in the external apparatus 60 can be connected thereto. As the connector 40, a diag connector can be used for connecting a fault diagnosis tool thereto, for example, in consideration of a case where the external apparatus 60 is a fault diagnosis tool. As the connector 40 in the communication system for a vehicle according to Embodiment 1, a connector 40 through which it is possible to transmit communication data and power is used.

The external apparatus 60 is present alone outside the vehicle, and is an apparatus that is capable of carrying out fault diagnosis of the vehicle 100 and rewriting a program or the like in the ECU by connecting it to the vehicle 100 to access the in-vehicle communication. For example, the external apparatus 60 may have a configuration of a fault diagnosis tool that carries out fault diagnosis of the vehicle 100. The external apparatus 60 includes the communication means 70 and the battery 80.

The communication means 70 is a transmitting and receiving means for communication with the in-vehicle communication when the external apparatus 60 and the vehicle 100 are connected. The communication means 70 is connected to the connector 40, and, is allowed to access the in-vehicle communication as a result of the gateway ECU 10 carrying out authentication. Access to the in-vehicle communication is carried out as a result of the communication means 70 being connected to the bus 30 for in-vehicle communication via the connector 40.

The battery 80 is a power source for supplying the power to the gateway ECU 10. Although the gateway ECU 10 includes the power supply circuit 81 inside, the gateway ECU 10 does not have a power source itself. Also, the gateway ECU 10 does not have a power supply line from an on-vehicle battery. Instead, the gateway ECU 10 has a power supply line 85 for connecting the battery 80 in the external apparatus 60 and the power supply circuit 81. The power supply line 85 is not connected to any power source in a state when it is not connected with the external apparatus 60. However, as a result of the external apparatus 60 being connected to the connector 40, the power supply line 85 is connected with the battery 80 built into the external apparatus 60. Thereby, the power is supplied to the gateway ECU 10 from the battery 80, and the power thus supplied from the battery 80 is supplied via the power supply circuit 81 to the respective ones of processing means such as the transceiver 20 for communication for outside of vehicle, the MCU 21, the transceiver 22 for in-vehicle communication and so forth. Therefore, it is preferable to use, as the battery 80, one of the same type as that of the on-vehicle battery.

That is, the gateway ECU 10 is not connected to any power source in the vehicle including the on-vehicle battery in a state when the external apparatus 60 is not connected to the vehicle 100, and thus, is in a stopped state. On the other hand, when the external apparatus 60 has been connected to the connector 40 in the vehicle 100, the power supply line 85 that connects the power supply circuit 81 and the battery 80 is formed, and power is supplied to the gateway ECU 10 from the battery 80 in the external apparatus 60. Due to the power supply, the gateway ECU 10 operates, starts authentication confirmation of the external apparatus 60, allows communication between the external apparatus 60 and the bus 30 for in-vehicle communication when the authentication is successful, and relays the communication. When authentication is not successful, the gateway ECU 10 does not allow communication between the external apparatus 60 and the bus 30 for in-vehicle communication.

Thus, in the gateway apparatus and the communication system for a vehicle according to Embodiment 1, the gateway ECU 10 does not operate in a case where the external apparatus 60 is not connected to the vehicle 100. Therefore, the consumption current of the gateway ECU 10 is zero. Further, since the gateway ECU 10 does not use the on-vehicle battery, the consumption current of the on-vehicle battery is also zero. Further, even when unauthorized access is made to a communication line in the connector 40 by an unauthorized external apparatus, such an external apparatus does not have a power supply line from the battery 80 to the connector 40. Therefore, the gateway ECU 10 does not operate. As a result, it is not possible to steal data or carry out an unauthorized input of data, and thus the security of the in-vehicle communication is ensured. Further, after the external apparatus 60 is connected to the vehicle 100 and the gateway ECU 10 operates, authentication is carried out normally. Thus, two steps of authentication including authentication using the power source and using the ID code or the like, are carried out. As a result, it is possible to improve the security. That is, in the on-vehicle gateway apparatus and the communication system for a vehicle according to Embodiment 1, it is possible to improve the security of the in-vehicle communication without occurrence of power consumption at a time of standby.

Note that in the present embodiment, the battery 80 may supply the power to various processing means inside the external apparatus 60 as needed. The battery 80 can be used to supply the power to both the gateway ECU 10 and also the external apparatus 60 itself, when the various processing means inside the external apparatus 60 are capable of operation by the battery 80.

Figure 2:
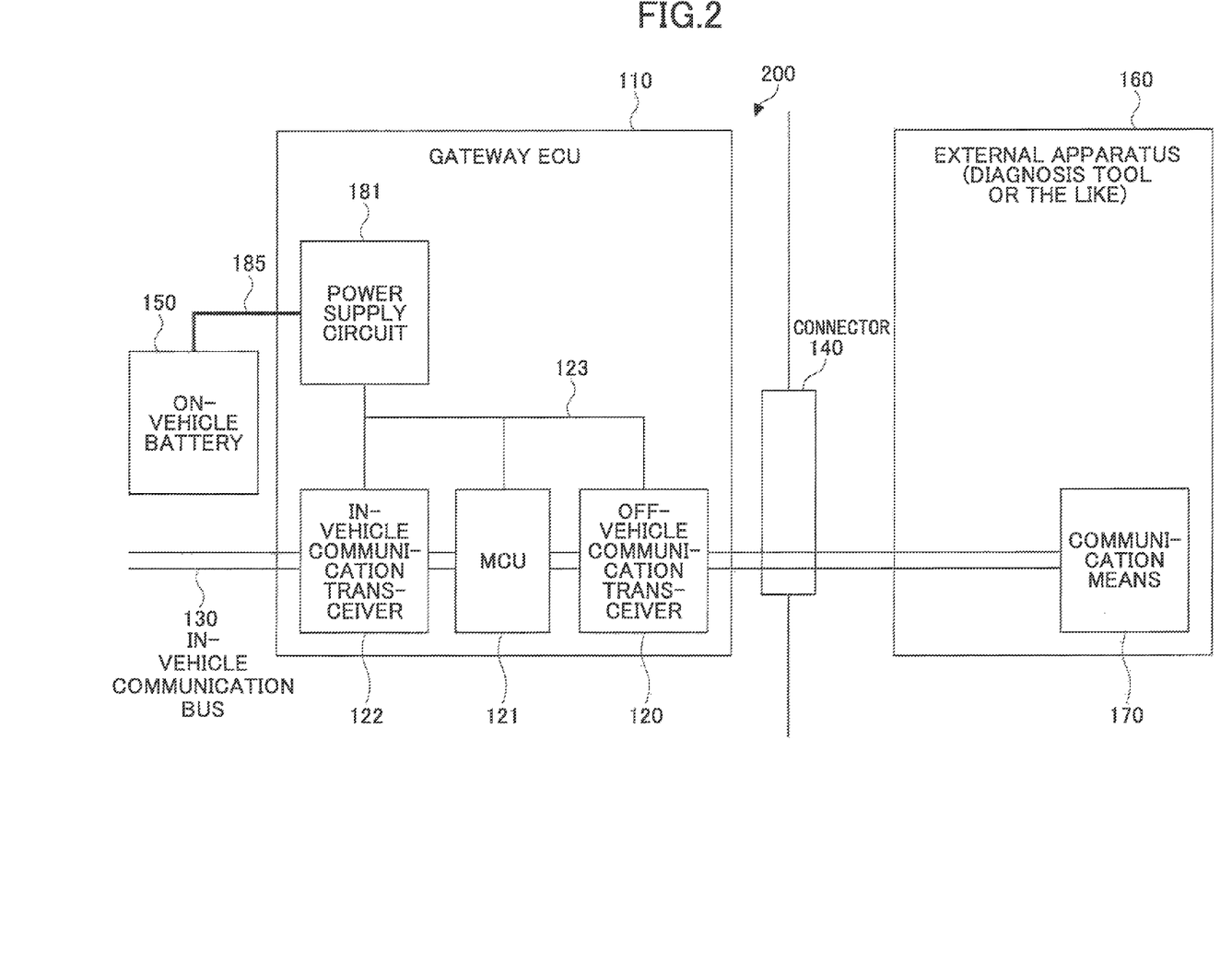
FIG. 2 is a diagram showing a conventional gateway apparatus and communication system for a vehicle as comparative examples.

FIG. 2 is a diagram showing a gateway apparatus and a communication system for a vehicle in the prior art as a comparative example. In FIG. 2, a gateway ECU 110 provided in a vehicle 200 includes a transceiver 120 for communication for outside of vehicle, a MCU 121, a transceiver 122 for in-vehicle communication, power supply lines 123 and a power supply circuit 181, and these are connected with a bus 130 for in-vehicle communication. This point is the same in Embodiment 1.

However, in FIG. 2, the power supply circuit 181 is connected with an on-vehicle battery 150 via a power supply line 185, and the power is supplied to the power supply circuit 181 from the on-vehicle battery 150. Further, an external apparatus 160 connected with a connector 140 includes a communication means 170 inside. However, the external apparatus 160 does not have a power source such as a battery.

In such a configuration, there is no way to supply the power to the gateway ECU 110 other than supplying the power from the on-vehicle battery 150. Further, since a time when the external apparatus 160 is connected is not known, the gateway ECU 110 should always be kept in a standby state. Thus, even in a case where the gateway ECU 110 does not carry out an authentication process or relaying communications, the gateway ECU 110 should always be in a standby state such that it can carry out these functions for when the external apparatus 160 is connected. As a result, the power is continuously consumed by the transceiver 120 for communication for outside of vehicle and so forth. Thereby, the power consumption in the on-vehicle battery 150 is increased, which may result in the battery's running down or degradation in the fuel consumption.

In contrast thereto, in the gateway apparatus and the communication system for a vehicle according to the present embodiment, as shown in FIG. 1, the power is not supplied to the gateway ECU 10 from the on-vehicle battery. Therefore, it is possible to make the power consumption in a standby state be zero, and thus, it is possible to considerably reduce the power consumption.

Embodiment 2

Figure 3:
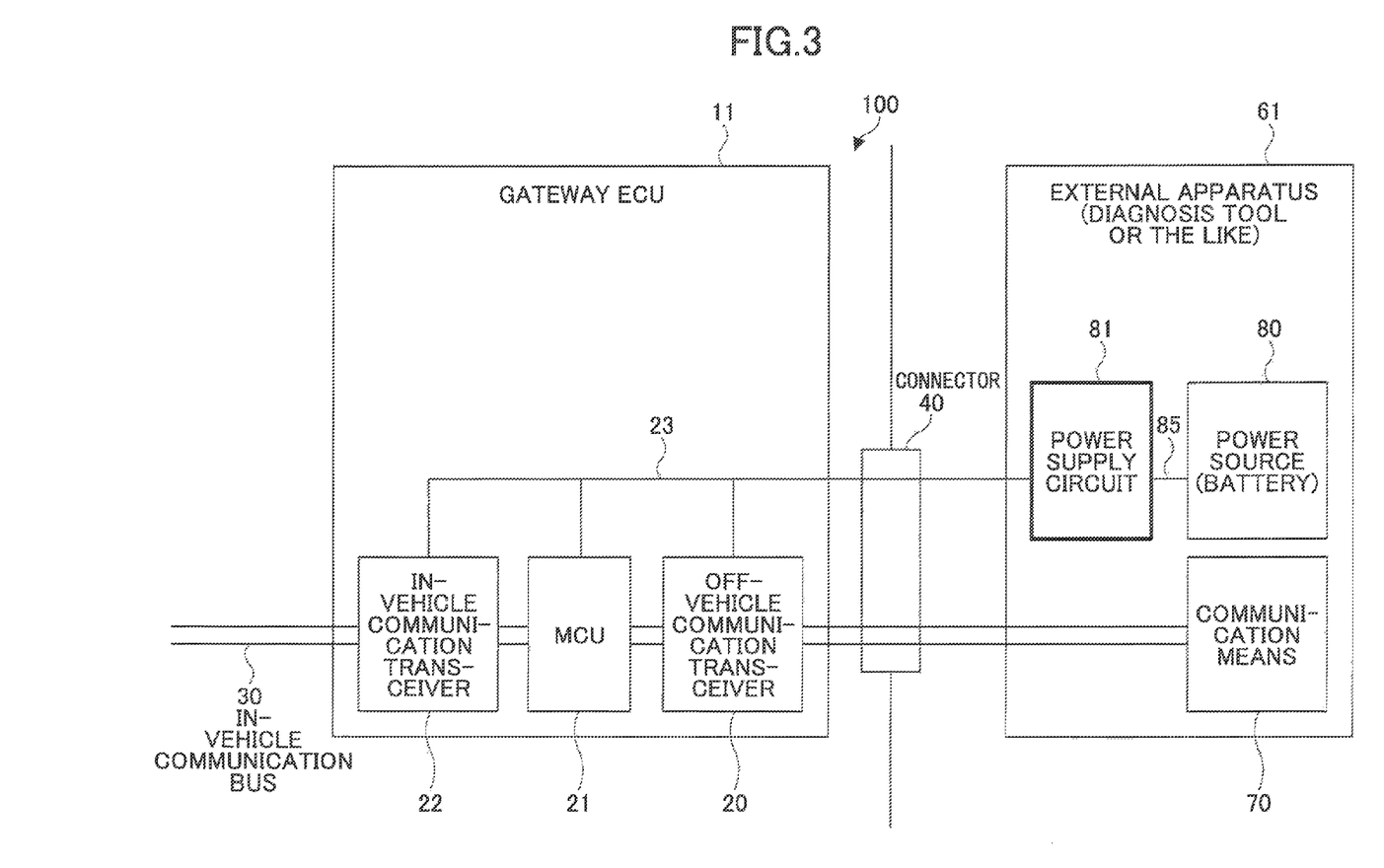
FIG. 3 is a configuration diagram showing one example of an on-vehicle gateway apparatus and a communication system for a vehicle according to Embodiment 2 of the present invention.

FIG. 3 is a configuration diagram showing one example of a gateway apparatus and a communication system for a vehicle according to Embodiment 2 of the present invention. In FIG. 3, the communication system for a vehicle according to Embodiment 2 includes a gateway ECU 11, an in-vehicle communication bus 30 and a connector 40 in a vehicle 100, and includes an external apparatus 61 outside the vehicle 100. Note that in the gateway apparatus and the communication system for a vehicle according to Embodiment 2, the same reference numerals are given to the same elements as those in the gateway apparatus and the communication system for a vehicle according to Embodiment 1, and the description thereof is omitted.

The on-vehicle gateway apparatus (gateway ECU 11) according to Embodiment 2 includes a transceiver 20 for communication for outside of vehicle, a MCU 21, a transceiver 22 for in-vehicle communication and power supply lines 23 inside. This point is common to the on-vehicle gateway apparatus (gateway ECU 11) according to Embodiment 2 and the gateway apparatus according to Embodiment 1. However, the on-vehicle gateway apparatus (gateway ECU 11) according to Embodiment 2 is different from the on-vehicle gateway apparatus (gateway ECU 10) according to Embodiment 1 in that the on-vehicle gateway apparatus (gateway ECU 11) according to Embodiment 2 does not have the power supply circuit 81.

The external apparatus 61 includes a communication means 70 and a battery 80 inside. This point is common to the external apparatus 61 and the external apparatus 60 according to Embodiment 1. However, the external apparatus 61 is different from the external apparatus 60 according to Embodiment 1 in that the external apparatus 61 further includes the power supply circuit 81.

That is, the communication system for a vehicle according to Embodiment 2 is different from the communication system for a vehicle according to Embodiment 1 in that the power supply circuit 81 provided inside the gateway ECU 10 in Embodiment 1 is provided inside the external apparatus 61 in Embodiment 2. Thus, it is possible to provide both the battery 80 and the power supply circuit 81 inside the external apparatus 61. Also in this case, the gateway ECU 11 never consumes power in a case where the external apparatus 61 is not connected to the vehicle 100. Further, at a time of connection between the external apparatus 61 and the vehicle 100, the power is supplied to the off-vehicle communication transceiver 20, the MCU 21 and the in-vehicle communication transceiver 22 in the gateway ECU 11 from the battery 80 in the external apparatus 61 via the power supply circuit 81 through the power supply lines 23. At this time, since the power supply circuit 81 is present in the external apparatus 61, the controlled power supply voltage is supplied to the connector 40. For example, a voltage on the order of 5 volts that is capable of driving the communication transceivers 20 and 22 and the MCU 21 in the gateway ECU 11 is directly supplied to the gateway ECU 11. Then, the gateway ECU 11 operates due to the power supply, authentication of the external apparatus 61 is carried out, and a process is carried out as to whether to carry out relaying communications with the external apparatus 61 based on the authentication result. That is, two steps of authentication including authentication using the power supply and authentication using an ID or the like after the power is supplied are carried out. Thus, it is possible to improve the security.

Note that as to the in-vehicle communication bus 30 and the connector 40, they are the same as those in Embodiment 1, thus the same reference numerals are given, and the description thereof is omitted.

By using the on-vehicle gateway apparatus and the communication system for a vehicle according to Embodiment 2, it is possible to make the power consumption of the on-vehicle gateway apparatus in a standby state be zero, in the same way as in the on-vehicle gateway apparatus and the communication system for a vehicle according to Embodiment 1. Also, at a time of connection between the external apparatus 61 and the vehicle 100, authentication of the external apparatus 61 is carried out, and it is possible to prevent unauthorized access. Further, since the power supply circuit 81 is provided in the external apparatus 61, it is possible to reduce the circuits in the gateway apparatus, and it is possible to reduce the cost of the vehicle 100.

Embodiment 3

Figure 4:
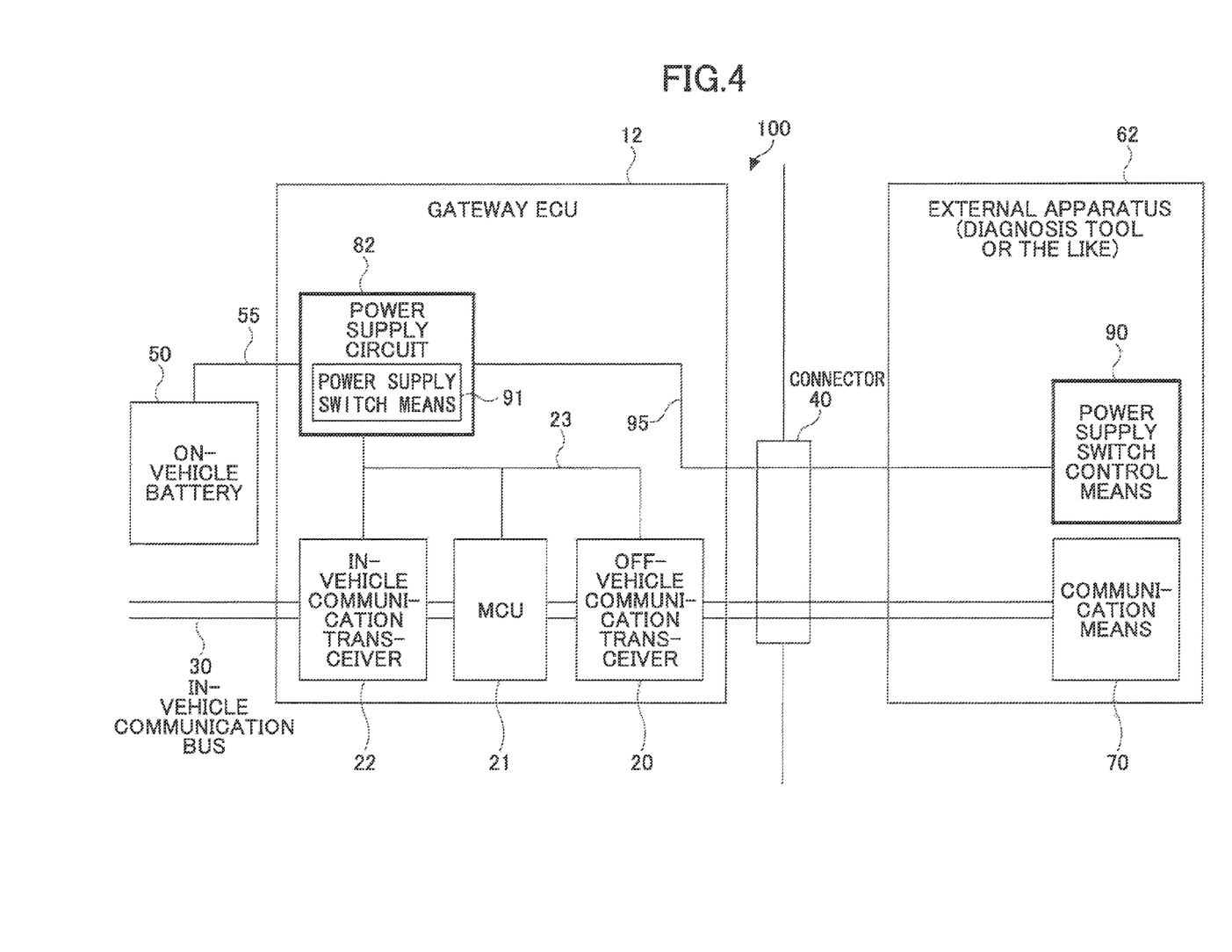
FIG. 4 is a configuration diagram showing one example of an on-vehicle gateway apparatus and a communication system for a vehicle according to Embodiment 3 of the present invention.

FIG. 4 is a configuration diagram showing one example of an on-vehicle gateway apparatus and a communication system for a vehicle according to Embodiment 3 of the present invention. The communication system for a vehicle according to Embodiment 3 has an on-vehicle battery 50 and a power supply line 55 in addition to a gateway ECU 12, an in-vehicle communication bus 30, a connector 40 and an external apparatus 62. In this point, the communication system for a vehicle according to Embodiment 3 is different from the communication systems for vehicles according to Embodiments 1 and 2. Note that, for the same elements as those in Embodiments 1 and 2, the same reference numerals are given, and the description thereof is omitted.

The on-vehicle gateway apparatus (gateway ECU 12) according to Embodiment 3 includes a transceiver 20 for communication for outside of vehicle, a MCU 21, a transceiver 22 for in-vehicle communication, power supply lines 23 and a power supply circuit 82. This point is common to the vehicle gateway apparatus (gateway ECU 12) according to Embodiment 3 and the vehicle gateway apparatus (gateway ECU 10) according to Embodiment 1. However, the on-vehicle gateway apparatus (gateway ECU 12) according to Embodiment 3 is different from the gateway apparatus according to Embodiment 1 in that the power supply circuit 82 has a power supply switch means 91 inside.

The power supply switch means 91 is a means for switching between carrying out and not carrying out power supplying. The power supply switch means 91 supplies the power in an ON state, and stops the power supply in an OFF state. As long as it is possible to switch between carrying out and not carrying out power supplying, various means can be used as the power supply switch means 91. Various switches or switching devices can be used as the power supply switch means 91.

The on-vehicle battery 50 is a battery mounted in the vehicle 100, and supplies the power to various ECUs in the vehicle 100 and other processing means, in addition to the gateway ECU 12.

The power supply circuit 82 is connected with the on-vehicle battery 50 via the power supply line 55. When the power supply switch means 91 is set to the ON state, the power is supplied to the communication transceivers 20 and 22 and the MCU 21 from the on-vehicle battery 50. When the power supply switch means 91 is set to the OFF state, the power is not supplied. The power supply circuit 82 has a function of controlling the power supply voltage, and therefore, the power supplied to the communication transceivers 20 and 22 and the MCU 21 from the on-vehicle battery 50 via the power supply circuit 82 is such that the voltage is controlled, and thus, is of a voltage on the order of, for example, 5 volts.

Note that the power supply switch means 91 is set to the OFF state at a time of the gateway ECU 12 being in a standby state. Thus, normally, the power is not supplied to the communication transceivers 20 and 22 and the MCU 21 from the on-vehicle battery 50.

The external apparatus 62 has a communication means 70 inside. This point is common to the external apparatus 62 and the external apparatus 60 in the communication system for a vehicle according to Embodiment 1. However, the external apparatus 62 is different from Embodiment 1 in that the external apparatus 62 does not have a battery 80, and instead, has a power supply switch control means 90.

The power supply switch control means 90 is a control means that controls setting the ON state and the OFF state of the power supply switch means 91 inside the power supply circuit 82. The power supply switch control means 90 is connected with the power supply circuit 82 via the connector 40 and the control line 95 at a time of connection between the external apparatus 62 and the vehicle 100, and switches the power supply switch control means 91 inside into the ON state. Thereby, the power is supplied to the communication transceivers 20 and 22 and the MCU 21 via the power supply circuit 82 from the on-vehicle battery 50, and the gateway ECU 12 starts operating. Then, authentication confirmation of the external apparatus 62 is carried out, and access by the external apparatus 62 to the in-vehicle communication is allowed when the external apparatus 62 has been authenticated.

By using the on-vehicle gateway apparatus and the communication system for a vehicle according to Embodiment 3, when the external apparatus 62 and the vehicle 100 are not connected, the power supply switch means 91 is set to the OFF state. Therefore, it is possible to make the power consumption in the gateway ECU 12 be zero. Further, the external apparatus 62 has the power supply switch control means 90. Without this means, it is not possible to operate the power supply switch means 91 inside the gateway ECU 12. Therefore, an unauthorized external apparatus 62 cannot operate the gateway ECU 12, and thus, it is possible to ensure the security. Further, even after the gateway ECU 12 is operated, normal authentication is carried out. Thus, it is possible to further improve security using the two steps of authentication.

Note that the consumption current in the on-vehicle battery 50 is increased when the gateway ECU 12 is operating. However, the gateway ECU 12 operates only during when the external apparatus 62 is connected and a predetermined process such as a fault diagnosis process is being carried out. Therefore, overall, the power consumption of the on-vehicle battery 50 does not seem to be considerably increased.

Thus, by using the on-vehicle gateway apparatus and the communication system for a vehicle according to Embodiment 3, it is possible to eliminate the power consumption at a time of standby and improve the security while using the on-vehicle battery 50.

Embodiment 4

Figure 5:
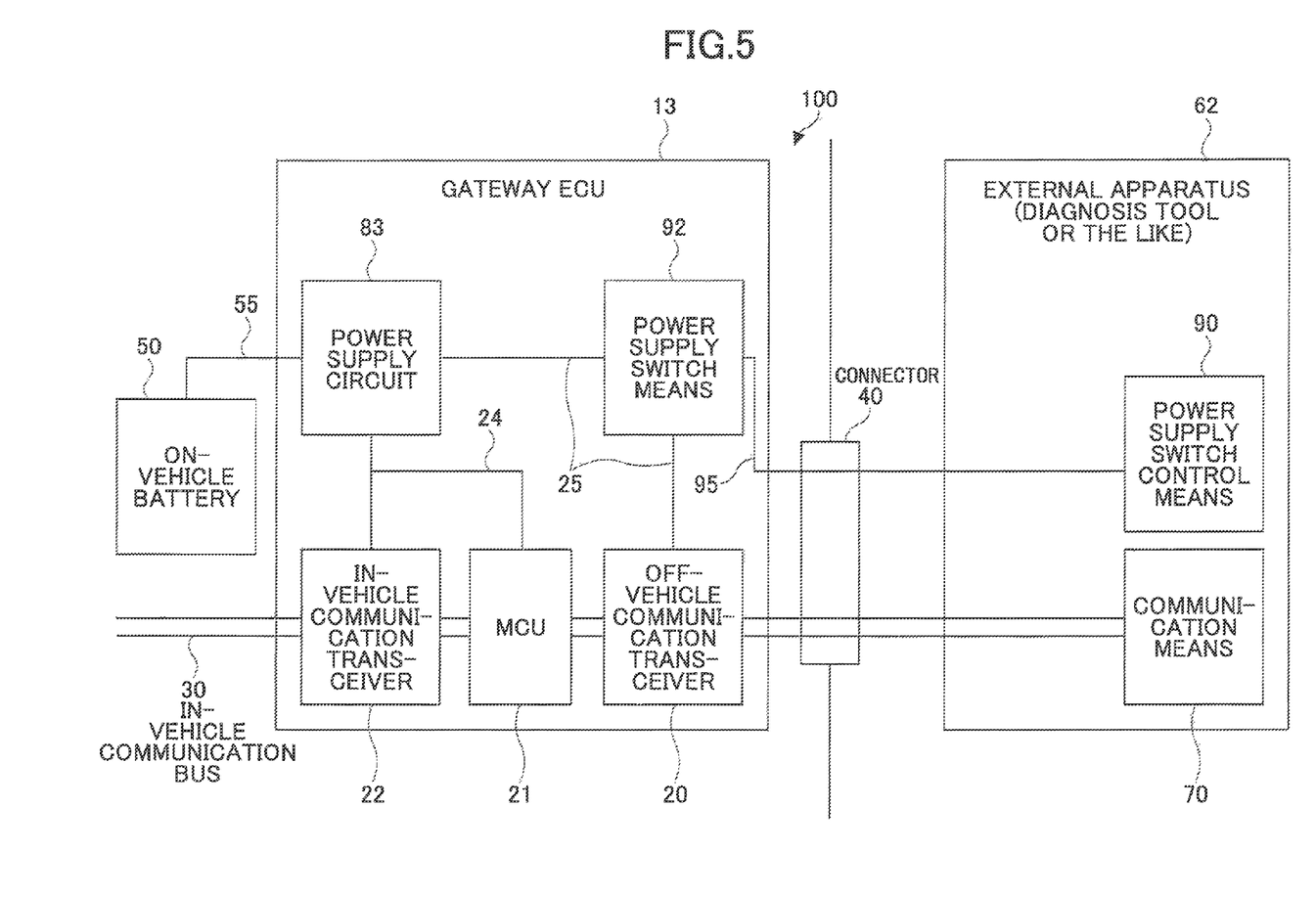
FIG. 5 is a configuration diagram showing one example of a gateway apparatus and a communication system for a vehicle according to Embodiment 4 of the present invention.

FIG. 5 is a configuration diagram showing one example of a gateway apparatus and a communication system for a vehicle according to Embodiment 4 of the present invention. In FIG. 5, the communication system for a vehicle according to Embodiment 4 includes, in a vehicle 100, a gateway ECU 13, an in-vehicle communication bus 30, a connector 40 and an on-vehicle battery 50, and includes, outside the vehicle 100, an external apparatus 62. This point is common to the communication system for a vehicle according to Embodiment 4 and the communication system for a vehicle according to Embodiment 3. Note that, for the same elements as those in Embodiments 1-3, the same reference numerals are given, and the description thereof is omitted.

The gateway ECU 13 includes a transceiver 20 for communication for outside of vehicle, a MCU 2, a transceiver 22 for in-vehicle communication, a power supply circuit 83 and a power supply switch means 92. This point is common to the gateway ECU 13 and the on-vehicle gateway apparatus according to Embodiment 3. However, the power supply switch means 92 is not inside the power supply circuit 81 but outside the power supply circuit 83, and is connected with the power supply circuit 83 by a power supply line 25. In this point, the gateway ECU 13 is different from the on-vehicle gateway apparatus (gateway ECU 12) according to Embodiment 3. Thus, the power supply switch means 92 can be installed not inside but outside the power supply circuit 83.

The power supply circuit 83 outputs the power through two power supply lines 24 and 25. However, the power supply circuit 83 carries out a process on the power supplied by the on-vehicle battery 50 via the power supply line 55 to control the voltage thereof to be (for example, on the order of 5 volts) suitable for the communication transceivers 20 and 22 and the MCU 21. Therefore, the power supply circuit 83 has approximately the same configuration as the power supply circuit 81 in Embodiment 1.

The power supply switch means 92 is a means for switching between carrying out and not carrying out power supplying as a result of being set to the ON state and the OFF state, in the same manner as that in Embodiment 3. According to Embodiment 4, the power supply switch means 92 is installed on the power supply line 25 between the power supply circuit 83 and the transceiver 20 for communication for outside of vehicle, and switches only between carrying out and not carrying out power supplying to the transceiver 20 for communication for outside of vehicle.

On the other hand, the external apparatus 62 has a communication means 70 and a power supply switch control means 90 inside, and thus, has the same configuration as that of the external apparatus 62 in the communication system for a vehicle according to Embodiment 3.

At a time of connection between the external apparatus 62 and the vehicle 100, the power supply switch control means 90 is connected with the power supply switch means 92 via the connector 40 and a control line 95. At this time, the power supply switch control means 90 switches the power supply switch means 92 into the ON state, and causes it to supply the power to the transceiver 20 for communication for outside of vehicle from the on-vehicle battery 50 via the power supply circuit 83. Thereby, the transceiver 20 for communication for outside of vehicle operates, and communication with the external apparatus 62 is started, and authentication of the external apparatus 62 is carried out.

By using the on-vehicle gateway apparatus and the communication system for a vehicle according to Embodiment 4, no power is supplied to the transceiver 20 for communication for outside of vehicle unless the external apparatus 62 having the power supply switch control means 90 inside is connected to the connector 40, and communication with the external apparatus 62 is not started. Therefore, it is possible to prevent unauthorized access by the external apparatus, and it is possible to ensure the security. Further, after the start of the communication, normal authentication using an ID code or the like is carried out. Thus, it is possible to further improve security by the two steps of authentication.

Further, at a time of standby, the transceiver 20 for communication for outside of vehicle does not operate. Therefore, it is possible to eliminate the power consumption in the outside-communication transceiver 20 at a time of standby.

On the other hand, in the gateway apparatus according to Embodiment 5, the power is always supplied to the MCU 21 and the transceiver 22 for in-vehicle communication via the power supply circuit 83 from the on-vehicle battery 50. For example, in a case where the gateway ECU 13 has a function(s) other than of relaying communications between the in-vehicle communication and the external apparatus 62, it is necessary to always supply the power to the gateway ECU 13. Therefore, such a configuration as that of the gateway apparatus according to Embodiment 4 is preferable for a case where the gateway ECU 13 has a function(s) other than the function of relaying communications and is an ECU that operates as a control means for any other purpose(s).

Thus, by using the on-vehicle gateway apparatus and the communication system for a vehicle according to Embodiment 4, it is possible to use a gateway ECU 13 having a function(s) other than the function of relaying communications. Also in this case, when the external apparatus 62 is not connected to the vehicle 100, the transceiver 20 for communication for outside of vehicle is not made to operate. Only at a time of connection between the external apparatus 62 and the vehicle 100, the transceiver 20 for communication for outside of vehicle is made to operate, and authentication of the external apparatus 62 is made possible. Therefore, it is possible to keep high security. Further, at a time of standby, the power supply to the transceiver 20 for communication for outside of vehicle is stopped. Thereby, it is possible to reduce the power consumption even slightly.

Embodiment 5

Figure 6:
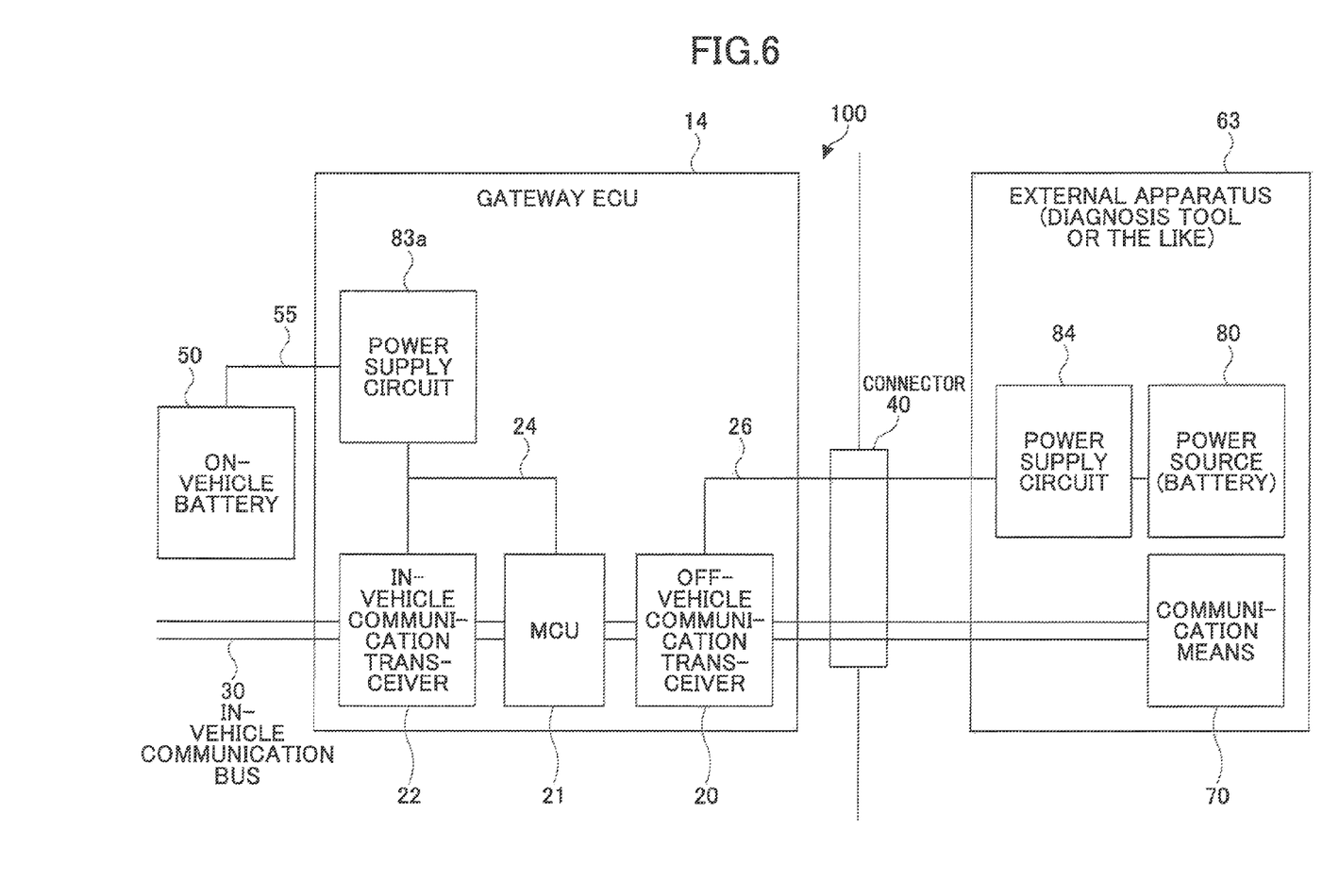
FIG. 6 is a configuration diagram showing one example of an on-vehicle gateway apparatus and a communication system for a vehicle according to Embodiment 5 of the present invention.

FIG. 6 is a configuration diagram showing one example of an on-vehicle gateway apparatus and a communication system for a vehicle according to Embodiment 5 of the present invention. In FIG. 6, the communication system for a vehicle according to Embodiment 5 includes, in a vehicle 100, a gateway ECU 14, an in-vehicle communication bus 30, a connector 40 and an on-vehicle battery 50, and has, outside the vehicle 100, an external apparatus 63. In Embodiment 5, for the same elements as those in Embodiments 1-4, the same reference numerals are given, and the description thereof is omitted.

The gateway apparatus (gateway ECU 14) according to Embodiment 5 includes a transceiver 20 for communication for outside of vehicle, a MCU 21, a transceiver 22 for in-vehicle communication, a power supply circuit 84 and power supply lines 24. This point is common to the gateway apparatus (gateway ECU 14) according to Embodiment 5 and the gateway apparatus (gateway ECU 13) according to Embodiment 4. On the other hand, the gateway apparatus according to Embodiment 5 does not have a power supply switch means 92, and the transceiver 20 for communication for outside of vehicle is connected to a power supply line 26 from an external apparatus 63. In this point, the gateway apparatus according to Embodiment 5 is different from the gateway apparatus according to Embodiment 4.

A power supply circuit 83a outputs the power to only two items, i.e., the MCU 21 and the transceiver 22 for in-vehicle communication. Other than this point, the power supply circuit 83a has the same configuration as the power supply circuit 83 in Embodiment 4. Also a point of being connected with an on-vehicle battery 50 via a power supply line 55 is the same as Embodiment 4. Due to this configuration, in a case where the gateway ECU 14 functions as an ECU for controlling the vehicle and has a function other than the function of relaying communications between the external apparatus 63 and in-vehicle communications, the gateway ECU 14 can carry out various processes by the MCU 21 in a state when it is connected to an in-vehicle communication bus 30.

On the other hand, the transceiver 20 for communication for outside of vehicle is connected to the external apparatus 63 via the power supply line 26.

The external apparatus 63 has a communication means 70, a battery 80 and a power supply circuit 84, and has the same configuration as the external apparatus 61 according to Embodiment 2 except that a connection target of the power supply circuit 84 is the transceiver 20 for communication for outside of vehicle. As a result of the external apparatus 63 being connected to the vehicle 100 via a connector 40, the power having the power supply voltage which is controlled is supplied to the transceiver 20 for communication for outside of vehicle via the connector 40 and the power supply line 26. Thereby, the transceiver 20 for communication for outside of vehicle operates, and starts communication with the communication means 70 in the external apparatus 63. Then, authentication of the external apparatus 63 is carried out.

On the other hand, when the external apparatus 63 is not connected with the vehicle 100, no power source is present to supply the power to the transceiver 20 for communication for outside of vehicle. Therefore, the transceiver 20 for communication for outside of vehicle does not operate.

Therefore, as shown in FIG. 6, as long as the external apparatus 63 in which the battery 80 and the power supply circuit 84 are mounted is not connected to the vehicle 100, the transceiver 20 for communication for outside of vehicle does not operate, and even when an unauthorized external apparatus has been connected to the vehicle 100, it is not possible to access the in-vehicle communication. Further, even after communication between the external apparatus 63 and the communication means 70 is started, normal authentication is carried out. Further, the transceiver 20 for communication for outside of vehicle does not operate in a standby state, and does not consume the power. Therefore, it is possible to reduce the power consumption even slightly.

Thus, by using the on-vehicle gateway apparatus and the communication system for a vehicle according to Embodiment 5, it is possible that the gateway apparatus has a function of relaying communications and also another control function while ensuring high security. Further, as for the relaying function, it is possible to reduce the power consumption in the communication function at a standby state.

Thus, the preferable embodiments have been described in detail. However, the present invention is not limited to the above-described embodiments, and it is possible to additionally carry out various changes and replacements on the above-mentioned embodiments without departing from the scope of the present invention.

INDUSTRIAL APPLICABILITY

The present invention can be applied to on-vehicle gateway apparatuses and communication systems for vehicles to be used in vehicles in which on-vehicle LANs are mounted, and have possibility of being connected with external apparatuses which then communicate with the on-vehicle LANs.

The invention claimed is:

1. An on-vehicle gateway apparatus that carries out authentication of an external apparatus at a time of connection between the external apparatus and a vehicle, and relays communications between the external apparatus and in-vehicle communication when the authentication is successful, wherein
at a time of connection between the external apparatus and the vehicle, the on-vehicle gateway apparatus operates due to power supply from the external apparatus, and carries out authentication of the external apparatus.

2. The on-vehicle gateway apparatus as claimed in claim 1, wherein
the power supply from the external apparatus is carried out from a battery incorporated in the external apparatus as a result of a power supply line from the external apparatus being formed at a time of connection between the external apparatus and the vehicle, and
the on-vehicle gateway apparatus has no power supply line from an on-vehicle battery.

3. The on-vehicle gateway apparatus as claimed in claim 2, wherein
the power supply from the external apparatus is carried out in a manner of a voltage being controlled by a power supply circuit inside the external apparatus.

4. The on-vehicle gateway apparatus as claimed in claim 2, further comprising:
a power supply circuit, wherein
the power supply from the external apparatus is carried out in a manner of a voltage being controlled by the power supply circuit.

5. The on-vehicle gateway apparatus as claimed in claim 1, further comprising:
a transceiver for communication for outside of vehicle for communication with the external apparatus, wherein
at a time of connection between the external apparatus and the vehicle, the transceiver for communication for outside of vehicle operates due to power supply from the external apparatus.

6. The on-vehicle gateway apparatus as claimed in claim 5, further comprising:
a power supply line from an on-vehicle battery and a power supply circuit, wherein
power supply to parts other than the transceiver for communication for outside of vehicle is carried out from the on-vehicle battery.

7. The on-vehicle gateway apparatus as claimed in claim 6, wherein
when the external apparatus and the vehicle are not connected, the on-vehicle gateway apparatus operates to have a function other than a function of relaying communications between the external apparatus and the in-vehicle communication.

8. An on-vehicle gateway apparatus that carries out authentication of an external apparatus at a time of connection between the external apparatus and a vehicle, and relays communications between the external apparatus and in-vehicle communication when the authentication is successful, the on-vehicle gateway apparatus comprising:
- a power supply line from an on-vehicle battery;
- a power supply switch part that switches between carrying out and not carrying out power supply from the on-vehicle battery; and
- a transceiver for communication for outside of vehicle for communication with the external apparatus, wherein
- at a time of connection between the external apparatus and the vehicle, the on-vehicle gateway apparatus operates due to power supply from the on-vehicle battery as a result of switching in the power supply switch part being controlled by a control part provided in the external apparatus, and
- the power supply switch part is connected with the transceiver for communication for outside of vehicle, and communication with the external apparatus is started as a result of the power supply switch part switching between carrying out and not carrying out power supply to the transceiver for communication for outside of vehicle, and the on-vehicle gateway apparatus carries out authentication of the external apparatus.

9. The on-vehicle gateway apparatus as claimed in claim 8, wherein
power is supplied to parts other than the transceiver for communication for outside of vehicle from the on-vehicle battery without regard to the carrying out or not carrying out in the power supply switch part.

10. The on-vehicle gateway apparatus as claimed in claim 9, wherein
when the external apparatus and the vehicle are not connected, the on-vehicle gateway apparatus operates to have a function other than a function of relaying communications between the external apparatus and the in-vehicle communication.

11. A communication system for a vehicle, comprising:
an external apparatus connectable with a vehicle; and
an on-vehicle gateway apparatus that carries out authentication of the external apparatus at a time of connection between the external apparatus and the vehicle, and relays communications between the external apparatus and in-vehicle communication when the authentication is successful, wherein
the external apparatus includes a power supply part, the power supply part carries out power supply to the on-vehicle gateway apparatus at a time of connection between the external apparatus and the vehicle, and the on-vehicle gateway apparatus operates and carries out authentication of the external apparatus.

12. The communication system for a vehicle as claimed in claim 11, wherein
the on-vehicle gateway apparatus does not have a power supply line from an on-vehicle battery, and
the power supply part has a battery incorporated in the external apparatus, and a power supply line from the battery to the on-vehicle gateway apparatus is formed at a time of connection between the external apparatus and the vehicle.

13. The communication system for a vehicle as claimed in claim 12, wherein
the power supply part further has a power supply circuit connected with the battery, and controls a power supply voltage to the on-vehicle gateway apparatus.

14. The communication system for a vehicle as claimed in claim 12, wherein
the on-vehicle gateway apparatus has a power supply circuit connected with the power supply line, and controls a voltage supplied by the power supply part.

15. The communication system for a vehicle as claimed in claim 11, wherein
the on-vehicle gateway apparatus has a transceiver for communication for outside of vehicle for communication with the external apparatus, and
the transceiver for communication for outside of vehicle operates due to power supply from the power supply part at a time of connection between the external apparatus and the vehicle.

16. The communication system for a vehicle as claimed in claim 15, wherein
the on-vehicle gateway apparatus has a power supply line from an on-vehicle battery and a power supply circuit, and
power supply to parts other than the transceiver for communication for outside of vehicle in the on-vehicle gateway apparatus is carried out from the on-vehicle battery.

17. A communication system for a vehicle, comprising:
an external apparatus connectable with a vehicle; and
the on-vehicle gateway apparatus claimed in claim 8.

18. The communication system for a vehicle as claimed in claim 17, wherein
power is supplied to parts other than the transceiver for communication for outside of vehicle in the on-vehicle gateway apparatus from the on-vehicle battery without regard to the carrying out or not carrying out in the power supply switch part.

* * * * *